B. M. KNUDSON.
ANIMAL HANGER.
APPLICATION FILED APR. 9, 1913.
1,085,439.
Patented Jan. 27, 1914.
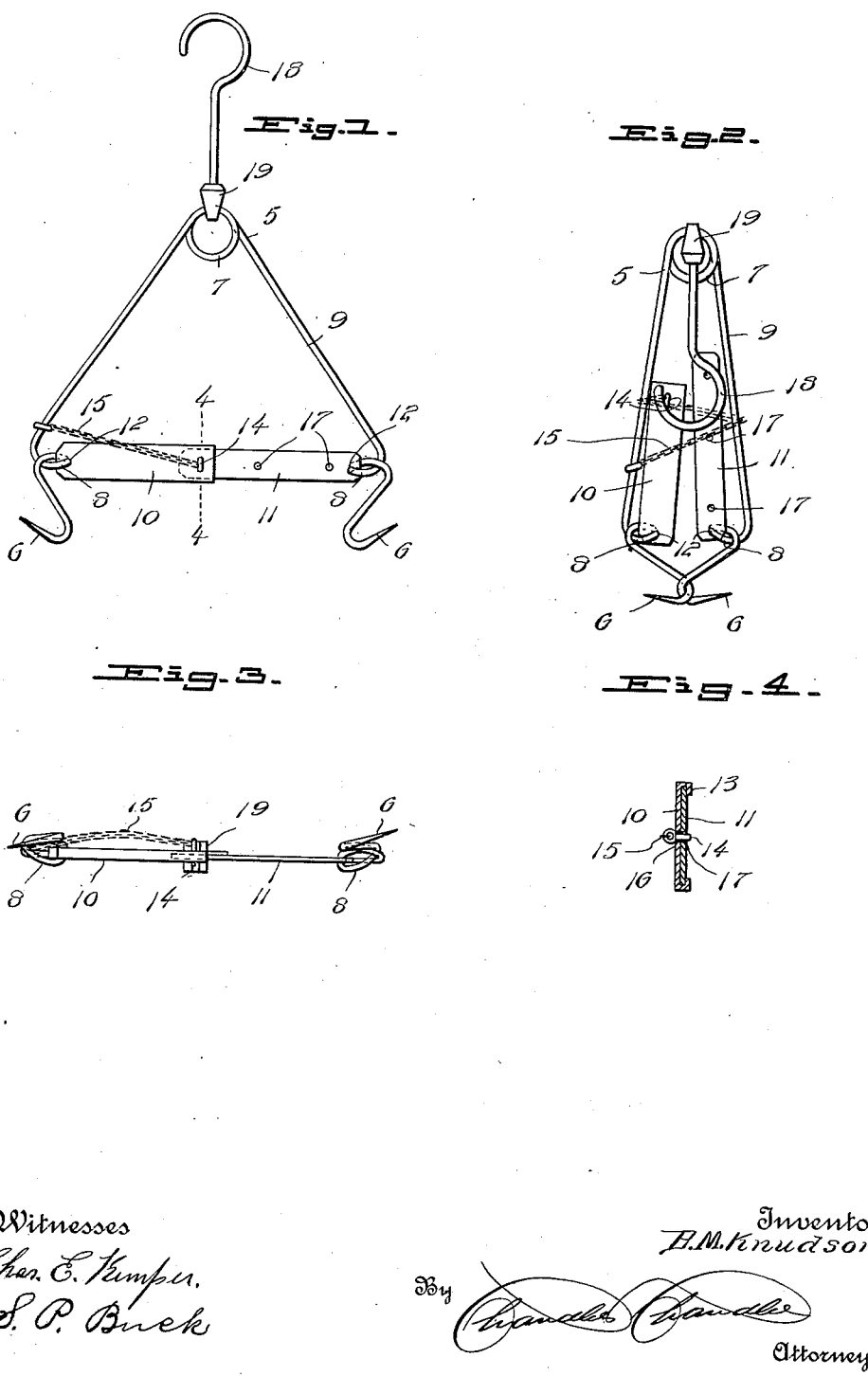

UNITED STATES PATENT OFFICE.

BRYAN M. KNUDSON, OF PONOKA, ALBERTA, CANADA.

ANIMAL-HANGER.

1,085,439.   Specification of Letters Patent.   Patented Jan. 27, 1914.

Application filed April 9, 1913. Serial No. 760,075.

*To all whom it may concern:*

Be it known that I, BRYAN M. KNUDSON, a subject of the King of England, residing at Ponoka, in the Province of Alberta, Dominion of Canada, have invented certain new and useful Improvements in Animal-Hangers; and I do hereby declare the following to be a full, clear, and exact description of the invention, such as will enable others skilled in the art to which it appertains to make and use the same.

This invention relates to animal hangers.

An object of the invention is to provide an improved form of hanger for supporting animals while being skinned.

Another object is to provide an improved form of animal hanger which may be quickly and easily adjusted for hanging animals of different sizes.

Another object is to provide a hanger of this character which is especially adapted for the use of trappers, and is therefore designed to be folded into relatively small space, for convenience in carrying it from place to place.

Another object is to provide a device of this character of which the principal and major element is formed of a single piece of material, for minimizing the cost of manufacture and assuring the maximum strength and durability.

Other objects and advantages may be recited hereinafter and in the claims.

In the accompanying drawings, which supplement this specification, Figure 1 is a side elevation view of my improved animal hanger in operative position. Fig. 2 is a similar view of the device in folded position. Fig. 3 is a bottom plan view, and Fig. 4 is a vertical sectional view taken on the line 4—4 of Fig. 1.

In these drawings, in which similar reference characters correspond with similar parts throughout the several views, the main frame or body member 5 is formed from a length of resilient wire or rod, sharpened at its ends, and has its end portions bent to form hooks 6. The middle portion of said length of wire is bent, preferably in the form of a coil or helical spring 7, and between this coil and the respective hooks, the wire is bent to form a loop 8. The loops 8 extend inward toward each other and lie in a plane at right angles to the common plane of the rectilinear elements 9, which latter stand at an angle of approximately thirty to ninety degrees to each other. The plane of each hook 6 is at a slight angle to the plane of the elements 9, so that they may be hooked into engagement with each other when the hanger is folded.

A pair of apertured slide bars 10 and 11 have their respective end apertures 12 in engagement with the loops 8. The bar 10 is preferably formed with in-turned flanges 13 which embrace the opposite edges of the bar 11, which latter is adapted to slide between said flanges and to telescope with the bar 10. I may provide any ordinary means for securing the bars 10 and 11 in adjusted position, and for this purpose I herewith illustrate a key or pin 14, secured to the member 5 by means of a chain 15, and this key 14 is adapted to be passed through the aperture 16 and one of the apertures 17, for holding them in adjusted position, after the holes 16 and 17 have been brought into registry. These elements 10 and 11 constitute an adjustable spreader member for holding the hooks 6 in proper spaced relation.

The hanger is adapted to be supported by means of a hook 18, through the medium of a swivel-link 19, so that when the hook 18 is engaged with a limb of a tree, the hanger may be turned on said swivel, at will, for maximum convenience in skinning an animal supported thereby. When it is desired to transport this improved hanger, the pin 14 is withdrawn from the registering apertures, the bar 11 is disengaged from the flanges 15, the hooks 6 are engaged with each other, whereupon, the members 10, 11 and 18 may be folded into substantially parallel relation with the side elements 9, the chain 15 being wrapped around the elements 10, 11 and 18 for holding all of the elements in compact and substantially fixed relation with each other.

From the foregoing, it will be seen that I have provided a device of this character which is fully capable of attaining the foregoing objects, in a thoroughly practical and efficient manner.

I do not limit my invention to the exact details of construction, combination and arrangement of parts as herewith illustrated and described, but my invention may only be limited by a reasonable interpretation of the claims.

I claim:

1. In an animal hanger, a member formed from a length of resilient wire bent at its middle portion so that the side sections adjacent to said middle portion lie in a common plane, hooks formed at the respective ends of said length of wire, loops formed between the respective hooks and said side sections, said loops extending toward each other and each lying in a plane substantially at right angles to the common plane of the side sections, and a brace member connected to said loops when in operative position and being adapted to be folded into substantially parallel relation with one of said side sections, the other said side section being adapted to be swung into substantially parallel relation with said brace member.

2. In combination, an animal hanger comprising a hanger member formed from a length of resilient material bent at its middle portion to form a spring and having hooks formed on its respective ends, loops adjacent to the hooks, and an adjustable and divisible spreader member secured to said loops and adapted to be swung into parallel relation with each other, a supporting hook connected to said middle portion and adapted to be swung downward in the direction of the first said hooks, said hooks lying in different planes and adapted to be brought into mutual engagement and retained therein by means of said spring.

3. An animal hanger consisting of a resilient metal rod bent midway of its ends to form divergent arms, each arm being bent near its free end into an eye directed toward the other arm in a plane at right angles to the common plane of the arms, and then extending beyond the eye in the same plane with the arms and terminating in hooks with their bills extending oppositely away from each other, a spreader member corresponding to each arm having a perforation through which the eye-forming portion of the corresponding arm is pivotally received, and means for securing the spreader members together.

In testimony whereof, I affix my signature, in the presence of two witnesses.

BRYAN M. KNUDSON.

Witnesses:
J. A. JACKSON,
GEO. F. ROOT.

---

Copies of this patent may be obtained for five cents each, by addressing the "Commissioner of Patents, Washington, D. C."